Aug. 30, 1938.  H. R. TEAR  2,128,382
LUBRICATING DEVICE
Filed Feb. 4, 1935   2 Sheets-Sheet 1
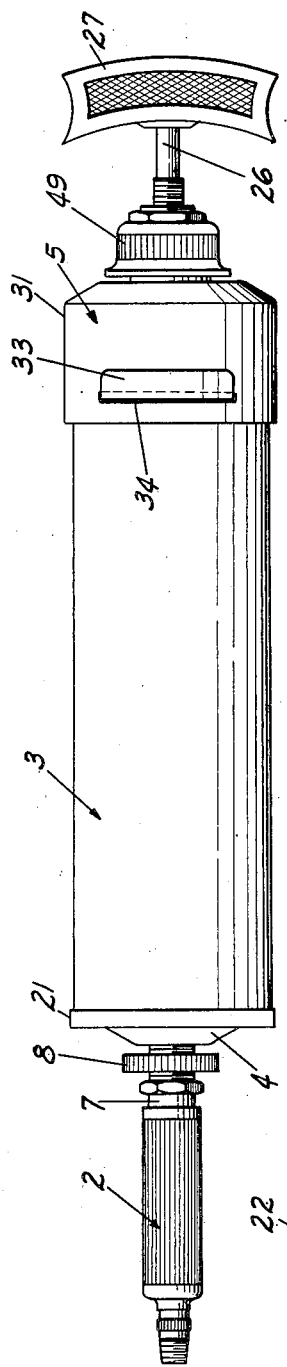
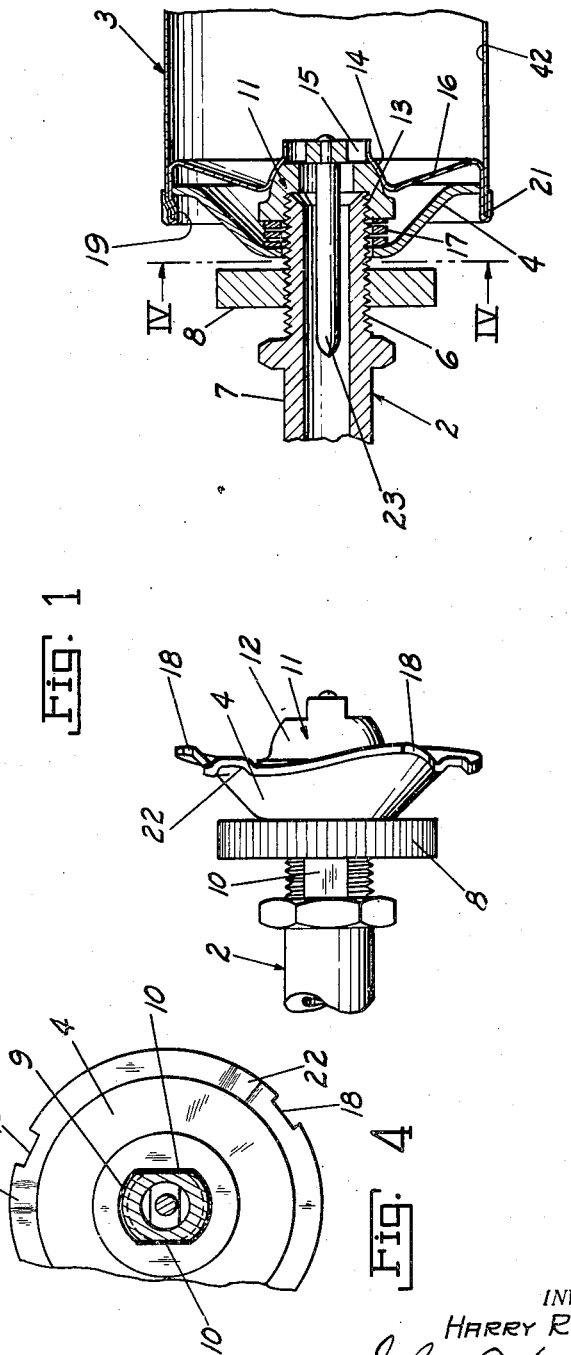
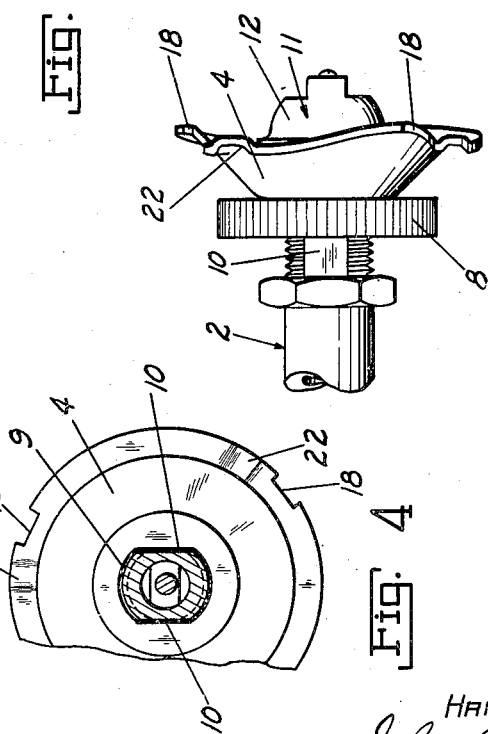
INVENTOR.
HARRY R. TEAR
BY John A. Watson
ATTORNEY.

Aug. 30, 1938.   H. R. TEAR   2,128,382
LUBRICATING DEVICE
Filed Feb. 4, 1935   2 Sheets-Sheet 2

INVENTOR.
HARRY R. TEAR
BY John A. Watson
ATTORNEY.

Patented Aug. 30, 1938

2,128,382

UNITED STATES PATENT OFFICE 2,128,382

LUBRICATING DEVICE

Harry R. Tear, Evanston, Ill., assignor to The Lubrication Corporation, Chicago, Ill., a corporation of Delaware Application February 4, 1935, Serial No. 4,769

15 Claims. (Cl. 221—47.3)

This invention relates to improvements in lubricating devices, and more particularly to lubricating guns and dispensers using interchangeable lubricant cartridges as a source of lubricant supply therefor.

Various types of lubricating guns employing, as a source of lubricant supply, cartridges which may be inserted within the gun, interchanged at will, and discarded when the lubricant contents thereof is exhausted have been proposed from time to time. Guns and dispensers of this type are particularly useful for the servicing of motor vehicle chassis in lubricant servicing stations, since one gun, if desired, may be used to perform a lubricant servicing operation upon several types of bearings each requiring lubricant of a different grade or character. A single lubricant gun of the cartridge type may often, in a small service station, take the place of several "specialized" lubricant guns thus resulting in a considerable saving in the cost of station equipment.

My present invention is directed to a cartridge type lubricating gun, or dispenser, which, because of the low cost of construction thereof, may be furnished not only to commercial lubricant servicing stations but may also be sold to individual car owners who might not feel justified in purchasing the more elaborate cartridge lubricating guns heretofore proposed.

Another object is to provide a cartridge type lubricating gun wherein the exterior wall of the cartridge is fully visible, thereby to permit the user to determine at a glance the kind of lubricant therein by means of a suitable label thereon, and further to enhance the advertising value of the said label.

A further object is to provide a cartridge type lubricating gun, or dispenser, which without alteration may be assembled for use with cartridges of various lengths, as desired, thus greatly augmenting the versatility and usefulness of the gun.

A further object is to provide a cartridge type lubricating gun wherein the cartridge serves as an interconnecting and supporting medium between the lubricant pump and the cartridge piston operating mechanism.

A further object is to provide a cartridge gun, as described, wherein sealing engagement between the cartridge outlet and the pump inlet is maintained, at all times, under a predetermined minimum pressure.

Other objects, the advantages, and uses of the invention will become apparent after reading the following specification and claims and after consideration of the drawings forming a part of this specification wherein:

Fig. 1 is a side elevation of a cartridge type hand lubricating gun constructed in accordance with the invention;

Fig. 2 is a fragmentary sectional view of a forward portion of the gun;

Fig. 3 is a fragmentary side elevation of the pump and cartridge interconnecting mechanism;

Fig. 4 is a sectional view along the line IV—IV of Fig. 2, a part thereof being broken away;

Figure 5:
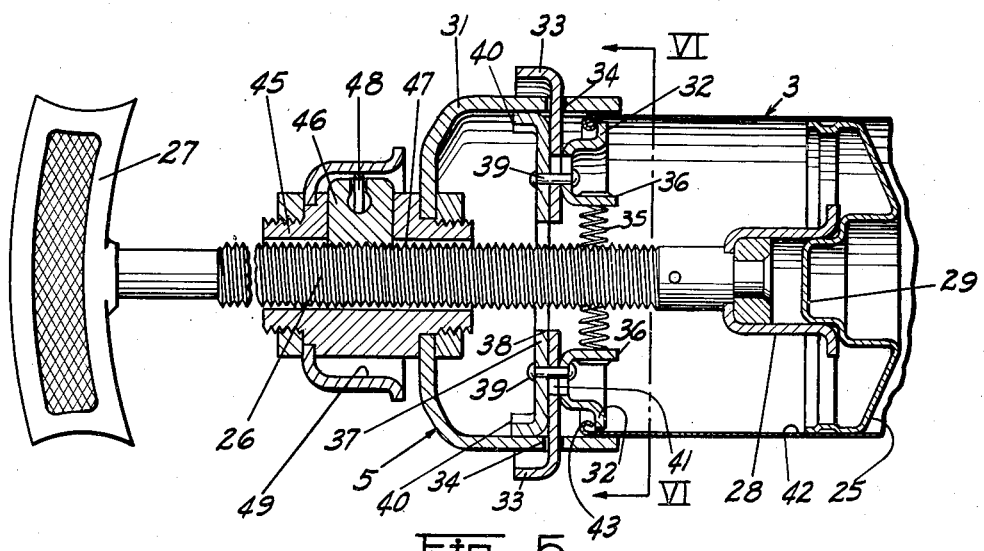
Fig. 5 is a view similar to Fig. 2 of a rearward portion of the gun.

I have selected for illustration herein a lubricating gun of the cartridge type intended to be held in the hand of the operator and manually manipulated during a lubricating servicing operation.

With respect to Fig. 1 the assembled gun comprises, in general, a high pressure pump unit 2, an interchangeable lubricant supply cartridge 3 detachably secured to the pump unit 2 by engagement with a cartridge connector plate 4, and a cartridge piston operating mechanism 5 detachably secured to the rearward end of the cartridge 3.

The high pressure pump of the pump unit 2 may be constructed substantially after the manner described and claimed in the copending application of A. Y. Dodge and H. R. Tear Serial No. 727,604, filed May 26, 1934. In adapting the pump to my present invention, however, certain changes have been made therein including the provision of external threads 6 upon the rearward portion of the tubular body 7 of the pump unit upon which a knurled thumb nut 8 may be threaded. The cartridge connector plate 4 is formed with a central opening 9 therethrough, through which the threaded portion 6 of the body of the pump extends, the opening being of sufficient diameter to permit free longitudinal movement of the plate relative to the pump. In order that the connector plate 4 may not turn relative to the pump unit, opposed sides of the threaded portion 6 of the body 7 may be flattened as indicated at 10 in Figs. 3 and 4, the configuration of the opening 9 being such as to follow the cross-sectional contour of the portion 6 of the pump body thereby effectively to prevent the rotation of the connector plate relative to the pump. A cartridge connector stud 11 having an external convex spherical surface 12 and provided with internal screw threads 13 may be screwed on the end of the threaded portion 6 of the pump body, the outer and spherical surface of the stud serving to establish sealing engagement with the concave and spherical wall 14 of the cartridge outlet opening 15 in the forward end wall 16 of the cartridge. A compression spring 17 encompassing the rearward end of the pump body 7 between the stud 11 and the connector plate 4 functions to urge the plate in a direction away from the connector stud 11, and from the cartridge 3 when the latter is engaged with the stud.

With reference to Figs. 3 and 4 the cartridge connector plate 4 may be provided with bayonet recesses 18 in the periphery thereof, at spaced distances apart from one another, so that bayonet lugs 19, formed in the seam 21 between the side and head wall of the cartridge 3, may pass therethrough and upon relative rotation between the cartridge and connector plate assume a position within depressions 22 in the forward face of the connector plate, as illustrated.

During the interconnection of the cartridge 3 and pump unit 2 the thumb nut 8 may be turned upon the thread 6 so as to urge the connector plate 4 toward the stud 11 thus to compress the spring 17. After the lugs 19 on the cartridge have assumed their positions within the depressions 22, on the forward side of the connector plate, the thumb nut 8 may be turned to the position shown in Fig. 2 whereupon the compression spring 17 may function to maintain the connector plate 4 in close engagement with the lugs 19 on the cartridge and to urge the cartridge forwardly thus to establish lubricant tight contact between the wall 14 of the cartridge outlet opening 15 and the outer spherical wall 12 of the connector stud. It will be noted that the connector stud 11 may possess the further function of supporting the stationary high pressure piston 23 of the pump unit, as described in the said copending application.

Figure 6:
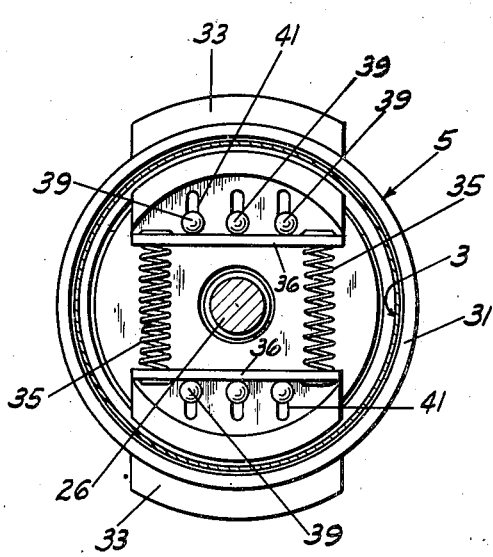
Fig. 6 is a sectional view along the line 6—6 of Fig. 5.

With reference to Figs. 5 and 6, the mechanism for operating the cartridge piston 25, which forms a movable closure for the rearward end of the cartridge 3, like the pump unit 2, is constructed for quick attachment and detachment to and from the rearward end of the cartridge, there being no intermediate support between pump unit and mechanism 5 other than the cartridge itself. The mechanism 5 may include any one of numerous types of piston operating devices such as a hand screw as illustrated herein and indicated at 26. The hand screw 26 may have a hand grip 27, at the rearward end thereof, to facilitate rotation of the screw, as well as longitudinal movement without rotation in the manner hereafter described. The forward end of the screw 26 is preferably provided with a cap 28 having a swivel connection with the screw 26 which is adapted to fit over a projection 29, on the rearward face of the piston, to establish engagement between screw and cartridge piston.

The hand screw 26 may be mounted for rotation upon a rigid metal body 31 adapted to encompass the extreme rearward end of the cartridge 3, as illustrated, so as to preclude lateral movement between the cartridge and the body 31. Means for securing the body 31 of the piston operating mechanism to the cartridge 3 may comprise a pair of jaws 32 each fixed, as by welding or the like, to an operating member 33, the members 33 extending through slots 34 in diametrically opposite sides of the cup-shaped body 31 so that manual pressure applied to the exposed portions of the operating members 33 in a direction toward the longitudinal axis of the cartridge and screw 26 will cause the jaws 32 to move inwardly toward one another. Compression springs 35 may be interposed between parallel portions 36 of the jaws 32 thus normally to urge the jaws away from one another and toward the inner wall of the cartridge 3. Means for directing the operating members 33 and their respective jaws along an axis normal to the axis of the screw 26 may comprise a member 37 formed with a central opening 38 through which the screw 26 may pass, and provided with pins 39 fixed thereto in parallel relationship with one another, and with the axis of the screw, which extend through aligned slots 41 in the jaws 32 and operating members 33. The member 37 is secured to the body 31 by welding as shown at 40.

The rearward end of the side wall 42 of the cartridge may be formed with an inwardly rolled bead 43 which may be engaged by the jaws 32 when the mechanism is attached to the cartridge as indicated in Fig. 5 to preclude movement of the body member 31 in a direction away from the cartridge. It is contemplated that the cartridge 3 shall be constructed of sheet metal of sufficient thickness to render the cartridge reasonably rigid for normal handling and use. If it is desired to employ relatively thin sheet metal to further reduce cost of the device, the bead 43 may be formed about a stiff wire to give added rigidity and strength to that portion of the cartridge which must bear the reaction of the pressure upon the piston 25 developed by the screw 26.

Although it is not an essential feature of the combination comprising my present invention, I have illustrated a quick release mechanism for permitting the screw 26 to be operated by rotation, or to permit, at will, the longitudinal movement of the screw without rotation. Such mechanism I have described and claimed in my copending application Serial No. 753,663, filed November 19, 1934. The mechanism may comprise a sleeve 45 having a plug 46 mounted for movement therethrough along an axis normal to the axis of the screw 26 and formed with screw threads 47, at its inner end, which are engageable with the threads of the screw 26. A spring 48 serves normally to urge the plug 46 in a direction away from the screw 26 and a cam member 49, mounted for rotation about the axis of the screw upon the sleeve 45, serves to move the plug 46 inwardly against the force of the spring 48 at will.

I have provided in the simple combination herein described a highly effective and most economical form of cartridge type hand lubricating gun, which may be manufactured at a relatively low cost as compared with such cartridge type guns heretofore proposed, all of which necessitate the use of some cartridge containing or supporting structure upon which structure the cartridge piston operating means and the pump mechanism is mounted. In addition to the reduction in the cost achieved and compactness of the parts, as for shipping and the like, I have accomplished, as a result of my improved construction, an objective heretofore unattained, in that cartridges of various lengths may be employed in the combination without in any way effecting the efficient and proper functioning of the gun when assembled.

In operation a cartridge containing the lubricant to be used is selected and the thumb nut 8 on the pump unit turned to compress the spring 17. Usually the thumb nut 8 will be found in this position prior to assembly since such position is assumed during the removal of the pump unit from the previously used cartridge. The cartridge is thereupon engaged with the connector plate 4, as described, and the thumb nut 8 turned to the position as shown in Fig. 2 securely to lock the cartridge and pump unit in operative relationship. Next the operator may, by pressing upon the operating members 33 urge the clamp jaws 32 inwardly so that the screw mechanism may be quickly and easily placed over the rearward end of the cartridge. Upon the release of manual pressure, applied to the members 33, the securing and locking of the mechanism 5 upon the cartridge 3 is completed. If the cartridge 3 is a new one, and the piston 25 is near the rearward end of the cartridge, it may be necessary to withdraw the hand screw 26 to its most rearward position, which may be done by operating the quick release mechanism in the manner described.

It is to be understood that the above described embodiments of the invention are for the purpose of illustration only, and various changes may be made therein without departing from the spirit and scope of the invention.

I claim:

1. A lubricating device comprising, a cylindrical lubricant-containing cartridge having an outlet opening in one end and a piston forming a movable closure for the opposite end, a pump unit having an inlet, a quick detachable connection for securing said pump unit to the side wall of the cartridge at the outlet end and for establishing lubricant communication between the cartridge outlet and pump inlet, a cartridge piston operating mechanism, and quick detachable means for securing said mechanism upon the rearward end of said cartridge in operative registration with said cartridge piston.

2. A lubricating device comprising, a cylindrical lubricant-containing cartridge having an outlet opening in one end and a piston forming a movable closure for the opposite end, a pump unit having an inlet, a quick detachable connection for securing said pump unit upon the outlet end of said cartridge and for establishing lubricant communication therebetween, a cartridge piston operating mechanism, and quick detachable means for securing said mechanism upon the rearward end of said cartridge in operative registration with said cartridge piston, said last named means including a bead formed on the rearward end of the cartridge side wall and movable jaws engageable with said bead associated with said cartridge piston operating mechanism.

3. A lubricating device comprising, a cylindrical lubricant-containing cartridge having an outlet opening in one end and a piston forming a movable closure for the opposite end, a pump unit having an inlet, a quick detachable connection for securing said pump unit upon the outlet end of said cartridge and for establishing lubricant communication therebetween, a cartridge piston operating mechanism, and quick detachable means for securing said mechanism upon the rearward end of said cartridge in operative registration with said cartridge piston, said last named quick detachable connection including cartridge engaging members and a spring normally urging the cartridge engaging members into a position to secure the piston operating mechanism upon said cartridge.

4. A lubricating device comprising, a cylindrical lubricant-containing cartridge having an outlet opening in one end and a piston forming a movable closure for the opposite end, a pump unit having an inlet, a quick detachable connection for securing said pump unit upon the outlet end of said cartridge and for establishing lubricant communication therebetween, a cartridge piston operating mechanism, quick detachable means for securing said mechanism upon the rearward end of said cartridge in operative registration with said cartridge piston, said last named quick detachable connection including cartridge engaging members and a spring normally urging the cartridge engaging members into a position to secure said mechanism upon said cartridge, and a manually operable member for rendering said spring ineffective.

5. A lubricating device comprising, a high pressure pump unit having an inlet, an original package lubricant container having an outlet at one end and a movable closure at the opposite end, means for detachably securing said pump unit to the side wall of the cartridge at the outlet end with the container outlet and pump inlet in registration, a force-multiplying thrust-producing mechanism, and means for detachably securing said mechanism upon said container in operative registration with said movable closure.

6. In combination, a pump unit having an inlet member, an original package lubricant container having an outlet opening, the walls of said outlet opening being fashioned for sealing contact with said pump inlet member, and means for detachably securing said pump unit upon the outlet end of said container with the pump inlet member in sealing contact with said wall of said container outlet opening, said means including a member adapted to engage with the cartridge and a spring for urging said member with said container in a direction to apply pressure between the pump inlet member and the wall of the container outlet.

7. In a lubricating device, a pump unit for use with a lubricant cartridge having an outlet opening through one wall comprising, a body member having a portion formed with an inlet opening, said portion being adapted for sealing engagement with the cartridge wall about said outlet opening, a cartridge engagement member movable relative to said body member rigidly to engage said cartridge, and resilient means cooperating with said body member and said engagement member to urge said portion of the body member into sealing engagement with the wall of the cartridge about said outlet.

8. In a lubricating device, a pump unit for use with a lubricant cartridge having a wall formed with an outlet opening comprising, an elongated body member having an inlet at one end adapted for sealing engagement with said wall about said outlet opening, a connector plate movably mounted on said body member and adapted to be secured to said cartridge, and resilient means acting between said body member and connector plate to urge the inlet of the body member into sealing engagement with the cartridge wall about said outlet.

9. In a lubricating device, a pump unit for use with a lubricant cartridge having a wall formed with an outlet opening comprising, an elongated body member having an inlet at one end adapted for sealing engagement with said wall about said outlet opening, a connector plate movably mounted on said body member and adapted to be secured to said cartridge, resilient means acting between said body member and connector plate to urge the inlet of the body member into sealing engagement with the cartridge wall about said outlet, and manual means cooperating with the body member and the connector plate for moving the body member inlet out of engagement with the cartridge wall about the outlet in opposition to said resilient means.

10. In a lubricating device, a feed mechanism for use with a lubricant cartridge having an open end formed with an internal bead comprising, a member adapted to be secured to said end of the cartridge, clamp jaws carried by said member and movable into engagement with the inner surface of the cartridge below said bead, and means carried by said member to urge the contents of the cartridge therefrom.

11. A lubricating device comprising a cartridge having an open end terminating in an internal bead and a piston closing said end, a member adapted to be secured to said end of the cartridge and including portions engaging the outer surface of the cartridge, clamping jaws carried by said member and movable into engagement with the inner surface of the cartridge below said bead whereby the member is secured to the cartridge, and means carried by said member and engageable with said piston for forcing the contents of the cartridge therefrom.

12. A lubricating device comprising a cartridge having an open end terminating in an internal bead and a piston closing said end, a member adapted to be secured to said end of the cartridge and including portions engaging the outer surface of the cartridge, clamping jaws carried by said member and movable into engagement with the inner surface of the cartridge below said bead whereby the member is secured to the cartridge, an elongated feed rod extending through said member and engageable with the piston, and means carried by said member for urging said feed rod into the cartridge to force the contents therefrom.

13. A lubricating device comprising, a cylindrical sheet metal cartridge having a fixed sheet metal end formed with an outlet opening and a piston forming a movable closure for its opposite end, a pump having an inlet member formed for sealing engagement with the cartridge wall around the outlet opening, means movably carried by said pump for securing the pump to the outlet end of the cartridge, and resilient means for urging said inlet member into sealing engagement with the cartridge outlet.

14. A lubricating device comprising, a cylindrical sheet metal cartridge having a fixed sheet metal end formed with an outlet opening and a piston forming a movable closure for its opposite end, piston operating mechanism, clamping means for detachably engaging the inner and outer surfaces of the cartridge side wall to secure the operating mechanism thereto at the end thereof adjacent to the piston, and means carried by said mechanism and engageable with the piston for forcing the contents of the cartridge therefrom.

15. A lubricating device comprising, a cylindrical sheet metal cartridge having a fixed sheet metal end formed with an outlet opening and a piston forming a movable closure for its opposite end, a pump having an inlet member formed for sealing engagement with the cartridge wall around the outlet opening, means movably carried by said pump for securing the pump to the outlet end of the cartridge, resilient means for urging said inlet member into sealing engagement with the cartridge outlet, piston operating mechanism, clamping means for detachably securing the operating mechanism to the side wall of the cartridge at the end thereof adjacent to the piston, and means carried by said mechanism and engageable with the piston for forcing the contents of the cartridge therefrom.

HARRY R. TEAR.